United States Patent
Yamaguchi et al.

(10) Patent No.: US 8,270,462 B2
(45) Date of Patent: Sep. 18, 2012

(54) ADAPTIVE EQUALIZER CIRCUIT

(75) Inventors: Hisakatsu Yamaguchi, Kawasaki (JP);
Shunichiro Masaki, Kawasaki (JP);
Hideki Ishida, Kawasaki (JP);
Kohtaroh Gotoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 417 days.

(21) Appl. No.: 12/543,109

(22) Filed: Aug. 18, 2009

(65) Prior Publication Data

US 2009/0310666 A1 Dec. 17, 2009

Related U.S. Application Data

(63) Continuation of application No. PCT/JP2007/053635, filed on Feb. 27, 2007.

(51) Int. Cl.
*H03H 7/30* (2006.01)
(52) U.S. Cl. ........ 375/232; 375/340; 375/326; 375/344; 375/229
(58) Field of Classification Search .................... 375/232
See application file for complete search history.

(56) References Cited

U.S. PATENT DOCUMENTS

| 6,788,749 | B2 * | 9/2004 | Voorman et al. | 375/340 |
| 7,535,956 | B2 | 5/2009 | Yamaguchi | |
| 7,577,193 | B2 * | 8/2009 | Goth | 375/232 |
| 7,593,497 | B2 * | 9/2009 | Conner | 375/362 |
| 2005/0226355 | A1 | 10/2005 | Kibune et al. | |

FOREIGN PATENT DOCUMENTS

| EP | 1 585 279 A2 | 10/2005 |
| JP | 61-058334 A | 3/1986 |
| JP | 2005-303607 A | 10/2005 |
| JP | 2006-222809 A | 8/2006 |

* cited by examiner

*Primary Examiner* — Lihong Yu
(74) *Attorney, Agent, or Firm* — Fujitsu Patent Center

(57) ABSTRACT

An adaptive equalizer circuit includes an equalizer circuit configured to produce an output data signal in response to an equalizing factor, a data detecting circuit configured to detect a signal level of the output data signal in a given unit time at predetermined timing, a boundary detecting circuit configured to detect a signal level of the output data signal at a timing that is ½ unit time away from the predetermined timing, and a control unit configured to detect, multiple times, a pattern having consecutive data items of a first value followed by a data item of a second value, and to adjust the equalizing factor such that a data detection value and a boundary detection value obtained for the data item of the second value are equal to each other a certain percentage of times, and are different from each other substantially the same percentage of times.

10 Claims, 18 Drawing Sheets

ADAPTIVE EQUALIZER CIRCUIT

CROSS-REFERENCE TO RELATED APPLICATIONS

This is a continuation of International Application No. PCT/JP2007/053635, filed on Feb. 27, 2007, the entire contents of which are hereby incorporated by reference.

FIELD

The disclosures herein generally relate to equalizer circuits relate to an adaptive equalizer circuit that adaptively operates in response to changes in transmission line characteristics.

BACKGROUND

An equalizer circuit is used to compensate for losses when transmission lines and cables having losses are used for data exchanges between LSIs, between devices or circuit blocks within a chip, between boards or housings, etc. FIG. 1 is a drawing illustrating an example of the configuration of a related-art equalizer circuit. An equalizer circuit 12 of FIG. 1 receives a data waveform from a transmission line 10, and supplies a corrected data waveform to a data detection circuit 11. The equalizer circuit 12 is an analog derivative equalizer, which includes an element 13 for outputting a received signal as it is, a first derivative element 14, a second derivative element 15, an amplifier 16 having gain A0, an amplifier 17 having gain A1, an amplifier 18 having gain A2, and an adder 19. The equalizer circuit 12 adds up the outputs of the elements 13 through 15 after amplification according to their respective gains, thereby enhancing and correcting changes in the input signal.

FIG. 2 is a drawing illustrating a unit pulse response of the equalizer circuit 12. The horizontal axis represents time, and the vertical axis represents signal amplitude. The output of the transmission line and the output of the equalizer circuit 12 are illustrated as observed when a pulse having a width of 1 unit time length and having an amplitude of 1 is input into the transmission line 10. A rise in a waveform output from the transmission line is gentle. Due to a length exceeding one unit, inter-symbol interference is large. The output of the equalizer circuit, on the other hand, has enhanced signal changes, so that its rise is steep, resulting in small inter-symbol interference.

In the configuration illustrated in FIG. 1, equalizing factors A0, A1, and A2 of the equalizer circuit 12 may be adjusted in response to the characteristics of the transmission line 10, thereby ensuring a sufficient data amplitude that is properly receivable despite changes in the characteristics of the transmission line 10. Adaptive equalization is a technology that changes equalizing factors in response to changes in the characteristics of the transmission line 10.

FIG. 3 is a drawing illustrating another example of the configuration of a related-art equalizer circuit. The equalizer circuit of FIG. 3 includes transistors 21 through 28, a variable resistor 29, resistors 30 through 32, and a capacitor 33. The resistance of the variable resistor 29 is adjusted in response to the setting of equalizing factor EQ thereby to adjust the direct current gain of a differential amplifier that is comprised of the transistors 21 and 22, the variable resistor 29, the capacitor 33, and the resistors 31 and 32. While high frequency characteristics are maintained by a capacitive coupling of the capacitor 33, the resistance of the variable resistor 29 is increased to lower the direct current gain.

FIG. 4 is a drawing illustrating an example of the frequency characteristics of the equalizer circuit illustrated in FIG. 3. The horizontal axis represents signal frequency, and the vertical axis represents the gain of the equalizer circuit. As the equalizing factor EQ is changed in 8 steps from 0 (i.e., 0x0 in hexadecimal form) to 7 (i.e., 0x7 in hexadecimal form), the gain of lower frequency components inclusive of the direct current component may be lowered while maintaining the gain of higher frequency components. Namely, the equalizer circuit of FIG. 3 has the function to amplify frequency components more in higher frequencies than in lower frequencies. Data passing through a transmission line or the like may end up having reduced high frequency components. An equalizer circuit having the frequency characteristics as illustrated in FIG. 4 may be used to correct a received waveform by compensating for losses along the transmission line (i.e., attenuation in high frequency components).

In the configuration illustrated in FIG. 3, the equalizing factor EQ applied to the equalizer circuit may be adjusted in response to the characteristics of the transmission line, thereby ensuring a sufficient data amplitude that is properly receivable despite changes in the characteristics of the transmission line. Adaptive equalization is a technology that changes the equalizing factor EQ in response to changes in the characteristics of the transmission line.

FIG. 5 is a drawing for explaining the concept of adaptive equalization. As illustrated in FIG. 5, a data waveform transmitted by a transmitter circuit 20 and having propagated through the transmission line 10 has waveform such as an eye pattern 40A. The eye pattern is observed when a single data signal having "0"s and "1"s appearing in a random manner is superimposed on itself multiple times for a period of several cycles. This data signal includes jitters caused by propagation through a transmission line, so that the timing of 0/1-signal-level transition is not aligned with predetermined timing (i.e., the timing synchronized with a clock signal). Because of this, the multiple superimposition of such a data signal for a period of several cycles results in signal waveforms with timing fluctuation being superimposed on one another, so that multiple trace lines appear at the positions of signal level transition as shown in the eye pattern 40A.

The eye pattern 40A is a data signal waveform observed when the temperature of the transmission line 10 is −20 degrees Celsius, for example. As the temperature of the transmission line 10 increases to 85 degrees Celsius, for example, the data signal waveform changes to an eye pattern 40B due to changes in the transmission line characteristics. Even when the transmission line characteristics are changed due to changes in the temperature of the transmission line 10, the use of adaptive equalization technology obtains a proper output from the equalizer circuit 12 by changing the equalizing factors of the equalizer circuit 12 (or the equalizing circuit of FIG. 3). Namely, the data signal waveform on the input side of the equalizer circuit 12 may significantly change from the eye pattern 40A to the eye pattern 40B. Despite such a change, automatic adaptive control may ensure that a data signal waveform on the output side of the equalizer circuit 12 exhibits almost no change from an eye pattern 41A to an eye pattern 41B. In this manner, properly receivable data amplitude may be automatically ensured with respect to the equalizer circuit 12.

FIG. 6 is a drawing illustrating an example of the configuration of an adaptive equalizer circuit using the equalizer circuit 12 of FIG. 1. In FIG. 6, the same elements as those of FIG. 1 are referred to by the same numerals.

The adaptive equalizer circuit of FIG. 6 includes a receiver circuit 50, an adaptive equalization logic 51, and a matrix 52.

A data waveform transmitted by the transmitter circuit 20 and having propagated through the transmission line 10 is received by the receiver circuit 50. The adaptive equalization logic 51 derives equalizing factors by use of an algorithm utilizing the method of least squares.

The receiver circuit 50 includes the equalizer circuit 12, an analog-to-digital converter (ADC) 61, a data detecting circuit 62, and a demultiplexer 63. The adaptive equalization logic 51 includes a convolution computing circuit 64, a correlation and error computing circuit 65, a multiplier 66, a buffer 67, and an integrator 68.

According to the method of least squares, a difference between an output amplitude y of the receiver circuit 50 and an expected amplitude d is computed by the correlation and error computing circuit 65 as an error amplitude e, and feedback control is performed to minimize the mean squares of the error e. In order to bring the mean squares of the error amplitude e close to zero, the error amplitude e may need to be made uncorrelated with input amplitudes F0, F1, and F2 for the respective equalizing factors that are to be adjusted. In this manner, the principle of adaptive equalization is clear. When adaptive equalization is to be implemented as LSI, a digital region is generally employed for such implementation as digital implementation is suitable for LSI.

In the configuration illustrated in FIG. 6, the output amplitude of the equalizer circuit 12 is converted into a digital code by the analog-to-digital converter (ADC) 61 in order to achieve adaptive equalization in a digital region. In order to obtain the error amplitude e with respect to the digital code output of the ADC, the expected amplitude d may be multiplied by an output logic value (i.e., +1/−1) of the data detecting circuit 62, and, then, a difference between the resulting product and the digital code may be obtained. In so doing, the input and output latency of the analog-to-digital converter 61 may need to be taken into consideration. To this end, there may be a need to identify which bits contained in the demultiplexer data (i.e., the output of the demultiplexer 63) correspond to the ADC output digital code. The correlation and error computing circuit 65 performs correlation computation to select one-bit data corresponding to the ADC output digital code from the N-bit demultiplexer data. Namely, correlation between each bit of the demultiplexer data and the ADC output digital code is computed to select one-bit data that exhibits the highest correlation.

When an adaptive equalizer circuit is implemented as LSI, timing alignment as described above brings about increases in circuit size and power consumption. For example, the size of the correlation and error computing circuit 65 for performing timing alignment may be so big as to occupy half the circuit area of the adaptive equalization logic 51 illustrated in FIG. 6. In this manner, the adaptive equalizer circuit as illustrated in FIG. 6 has a problem in that its circuit size and power consumption are large.

Moreover, the adaptive equalizer circuit of FIG. 6 derives input amplitudes F0, F1, and F2 through computation by the convolution computing circuit 64. The matrix 52 is matrix data reflecting the transmission line characteristics. Convolution between the matrix 52 and the demultiplexer data is performed to estimate the input amplitudes F0, F1, and F2. The matrix 52 may be obtained by acquiring a unit-pulse-response waveform with respect to each of the transmission line 10 and the elements 13 through 15 of the equalizer circuit 12, followed by quantizing the obtained unit-pulse-response waveforms. The size of the matrix 52 is determined by the length of an inter-symbol interference component of the transmission line 10.

As described above, the adaptive equalizer circuit as illustrated in FIG. 6 may need to be provided in advance with the matrix 52 responsive to the transmission line characteristics. A different matrix 52 is thus provided for each different transmission line for which the equalizer circuit is to be used. Preparation of such matrixes requires a large amount of time and labor.

FIG. 7 is a drawing illustrating an example of the configuration of an adaptive equalizer circuit using the equalizer circuit of FIG. 2. This circuit of FIG. 7 is disclosed in Patent Document 1.

An adaptive equalizer circuit 100 of FIG. 7 includes an equalizer circuit 70, a data detecting circuit 71, a boundary detecting circuit 72, a demultiplexer 73, a clock recovery unit (CRU) 74, a phase interpolator circuit (PI) 75, a monitor unit 76, and a control unit 77. The equalizer circuit 70 has the configuration illustrated in FIG. 3. The phase interpolator circuit 75 generates two clock signals having a predetermined phase difference (e.g., 90 degrees) from each other based on a predetermined reference clock signal. One of the clock signals is supplied to the data detecting circuit 71, and the remaining one of the clock signals is supplied to the boundary detecting circuit 72.

The data detecting circuit 71 and the boundary detecting circuit 72 detect HIGH/LOW of the output signal of the equalizer circuit 70 at the edge timings of the respective clock signals supplied thereto. +1 may be output in response to HIGH detection, and −1 may be output in response to LOW detection. The phases of the clock signals supplied from the phase interpolator circuit 75 are controlled such that the data detecting circuit 71 performs signal detection at data centers, and the boundary detecting circuit 72 performs signal detection at data boundaries.

The clock recovery unit 74 includes a phase detector PD for detecting the phases of the outputs of the data detecting circuit 71 and boundary detecting circuit 72, and further includes a low-pass filter LPF for temporally integrating the phase detection results of the phase detector PD. The output of the low-pass filter LPF is applied to the phase interpolator circuit 75 as a signal for controlling the clock signals output from the phase interpolator circuit 75.

When data detection and boundary detection are performed at correct timings, the output of the boundary detecting circuit 72 assumes +1 or −1 with equal probability at the point of a data change between 0 and 1 regardless of the immediately preceding data detection value of the data detecting circuit 71. An integrated value of the output of the boundary detecting circuit 72 is thus substantially constant when data detection and boundary detection are performed at correct timings.

When data detection and boundary detection are not performed at correct timings, the output of the boundary detecting circuit 72 at the point of a data change between 0 and 1 is correlated with the immediately preceding output of the data detecting circuit 71. When the timing of the clock signals is earlier than expected, the output of the boundary detecting circuit 72 at the point of a data change between 0 and 1 is +1 (or −1) that is always at the same phase as +1 (or −1) of the immediately preceding data detection output of the data detecting circuit 71. When the timing of the clock signals is later than expected, the output of the boundary detecting circuit 72 at the point of a data change between 0 and 1 is −1 (or +1) that is always at the opposite phase from +1 (or −1) of the immediately preceding data detection output of the data detecting circuit 71. Determination may be made as to whether the timing of the clock signals is too early or too late in response to the phases of the outputs of the data detecting circuit 71 and boundary detecting circuit 72 detected by the phase detector PD. Then, the phase and frequency of the clock signals may be adjusted in response to the result of the determination thereby to generate proper clock signals that are synchronized with the received signal.

In the adaptive equalizer circuit 100 of FIG. 7, the monitor unit 76 and control unit 77 play a central role in adaptive equalization. The distribution of output logic values of the boundary detecting circuit 72 is analyzed in order to derive an equalizing factor applied to the equalizer circuit 70. A trigger signal generator 81 of the monitor unit 76 generates a trigger signal when the output of the data detecting circuit 71 is a particular pattern such as 1101, 1001, 0101, etc. In response to the trigger signal, an integrator 82 integrates the output logic values of the boundary detecting circuit 72 separately for each of the above-noted patterns.

The amount of phase variation in the data input into the data detecting circuit 71 changes in response to past data. When the above-noted patterns such as 1101, 1001, and 0101 are input, thus, the amount of phase variation with respect to the second half "01" differs depending on the first half "11", "10", and "01" that are past data. The histogram of phase variation amounts may fit to a normal distribution. In such a case, the relationship between output values and sample timings for data detection assumes a linear relation with respect to the values obtained through integration by the integrator 82. Based on this relationship, the control unit 77 estimates the amount of phase variation, and adjusts the equalizing factor of the equalizer circuit 70 to minimize the estimated amount of phase variation.

In the configuration illustrated in FIG. 7, the distribution of boundary data necessary to implement clock data recovery (CDR), which is one of the main functions of existing data receiver circuits, is analyzed to adjust an equalizing factor to its optimum value. The merit is that an existing circuit for CDR can be utilized. On the other hand, processing performed in the monitor unit 76 and the control unit 77 is complicated, requiring complex circuits. Further, the amount of phase variation may not properly fit to a normal distribution. There is thus a possibility that an optimum equalizing factor cannot be derived.

[Patent Document 1] Japanese Patent Application Publication No. 2005-303607

SUMMARY

According to an aspect of the embodiment, an adaptive equalizer circuit includes an equalizer circuit configured to produce an output data signal by correcting an input data signal waveform for each unit time in response to an equalizing factor, a data detecting circuit configured to detect a signal level of the output data signal in a given unit time at predetermined timing indicated by a clock signal synchronized with the output data, a boundary detecting circuit configured to detect a signal level of the output data signal at a timing that is ½ unit time away from the predetermined timing indicated by the clock signal, and a control unit configured to detect, multiple times, a predetermined data pattern having consecutive data items of a first logic value followed by a data item of a second logic value, and to adjust the equalizing factor such that a value of a detection result obtained by the data detecting circuit and a value of a detection result obtained by the boundary detecting circuit for the data item of the second logic value are equal to each other a certain percentage of times, and are different from each other substantially the same percentage of times.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments will be described with reference to the accompanying drawings.

Figure 8:
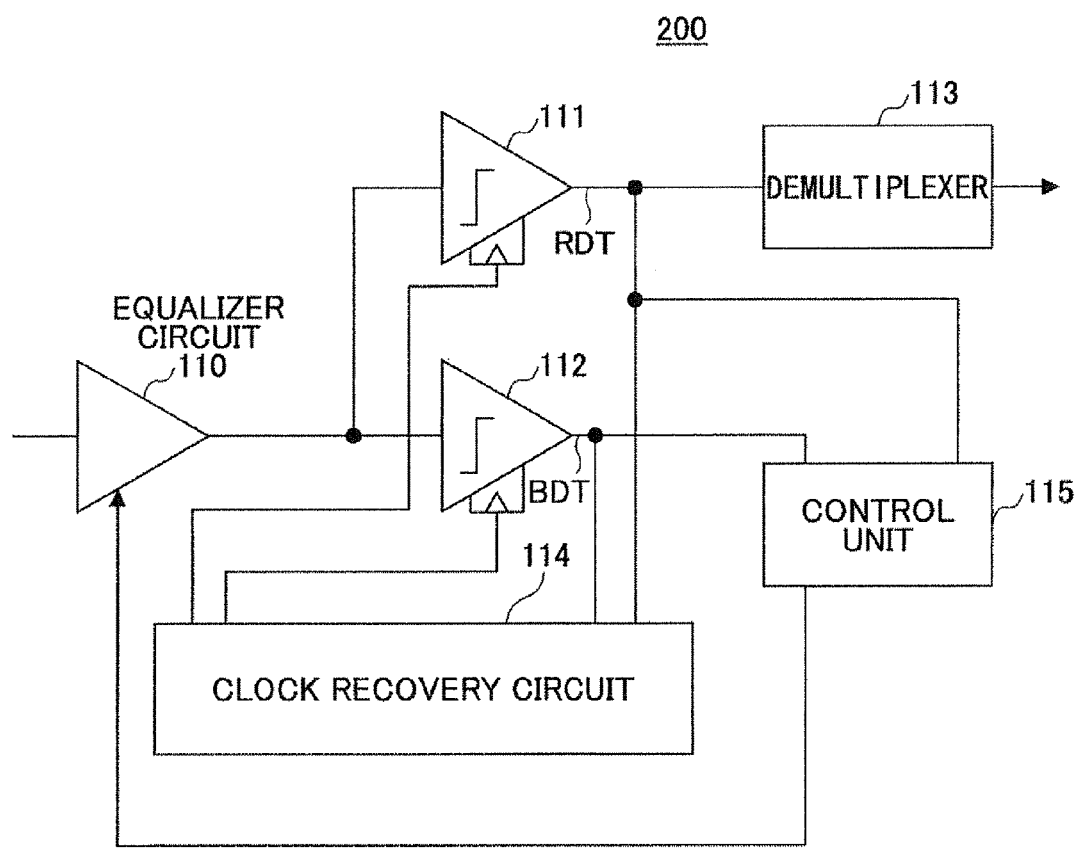
FIG. 8 is a drawing illustrating an example of the configuration of an adaptive equalizer circuit according to a disclosed embodiment.

FIG. 8 is a drawing illustrating an example of the configuration of an adaptive equalizer circuit according to the disclosed embodiment. An adaptive equalizer circuit 200 of FIG. 8 includes an equalizer circuit 110, a data detecting circuit 111, a boundary detecting circuit 112, a demultiplexer 113, a clock recovery circuit 114, and a control unit 115. The equalizer circuit 110 has the configuration illustrated in FIG. 3, for example.

The equalizer circuit 110 receives an input data signal waveform having a single data value for each unit time, and generates an output data signal obtained by correcting the input data signal in response to an equalizing factor. The clock recovery circuit 114 generates two clock signals having a predetermined phase difference (e.g., 90 degrees) from each other that are synchronized with the output data signal output from the equalizer circuit 110. One of the clock signals is supplied to the data detecting circuit 111, and the remaining one of the clock signals is supplied to the boundary detecting circuit 112.

The data detecting circuit 111 and the boundary detecting circuit 112 detect HIGH/LOW of the output data signal of the equalizer circuit 110 at the edge timings of the respective clock signals supplied thereto. +1 may be output in response to HIGH detection, and −1 may be output in response to LOW detection. The phases of the clock signals supplied from the clock recovery circuit 114 are controlled such that the data detecting circuit 111 performs signal detection at the center timing of each unit time, and the boundary detecting circuit 72 performs signal detection at the timing that is ½ unit time away from the center timing of each unit time, i.e., at the boundary between a unit time and a unit time (i.e., boundary between data and data).

Figure 7:
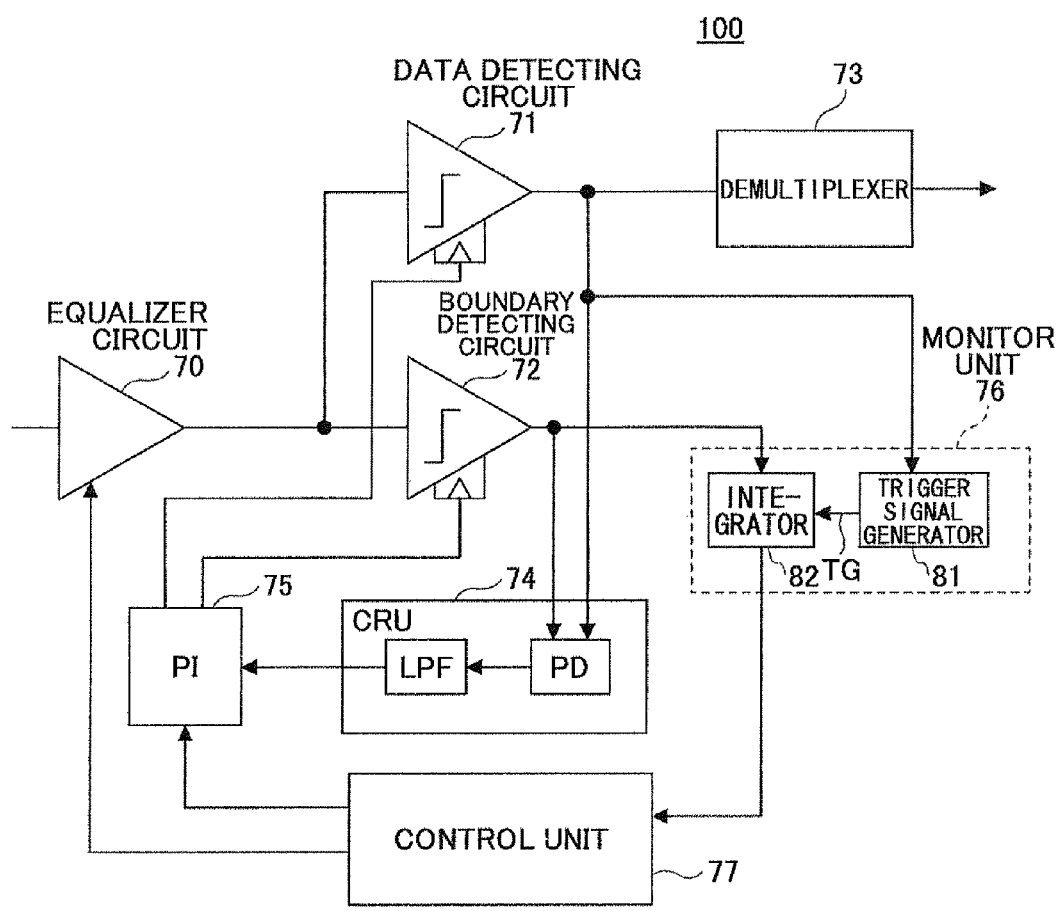
FIG. 7 is a drawing illustrating an example of the configuration of an adaptive equalizer circuit using the equalizer circuit of FIG. 2.

The clock recovery unit 114 detects the phases of the outputs of the data detecting circuit 111 and boundary detecting circuit 112 thereby to generate the clock signals synchronized with the output data signal of the equalizer circuit 110. The clock recovery circuit 114 corresponds to the clock recovery unit 74 and phase interpolator circuit 75 illustrated in FIG. 7. The clock recovery circuit 114 adjusts the phase and frequency of the generated clock signals in response to the output of the data detecting circuit 71 and the output of the boundary detecting circuit 72.

Data indicative of the detection results of the data detecting circuit 111 are demultiplexed by the demultiplexer 113 for provision to a subsequent sate as a multi-bit low-frequency signal. The control unit 115 detects a predetermined data pattern multiple times in the detection results RDT of the data detecting circuit 111 where the predetermined data pattern has a consecutive data series of first logic values followed by data of a second logic value. The control unit 115 adjusts the equalizing factor of the equalizer circuit 110 such that, with respect to the detection result BDT of the boundary detecting circuit 112 and the detection result RDT of the data detecting circuit 111 corresponding to the second logic value, a percentage of the times that the values of these two detection results are equal to each other is substantially equal to a percentage of the times that the values of these two detection results are different from each other. In the following, the operation of the control unit 115 will be described in detail.

Figure 1:
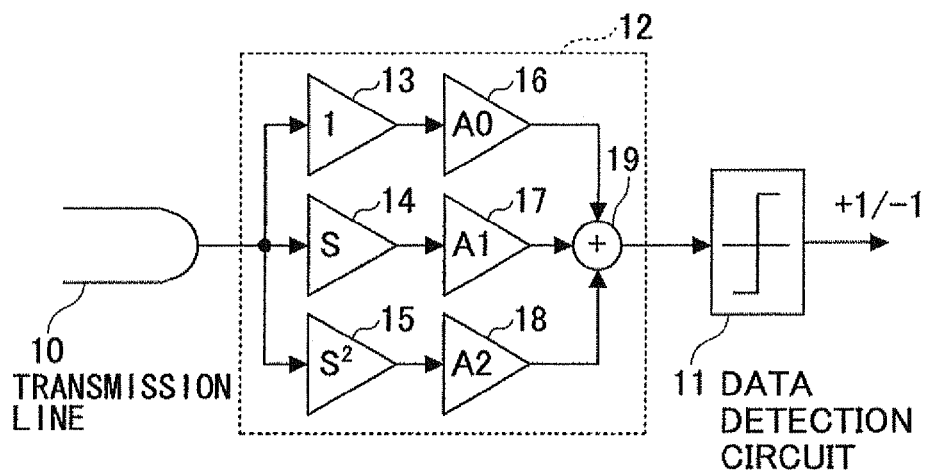
FIG. 1 is a drawing illustrating an example of the configuration of a related-art equalizer circuit.
Figure 2:
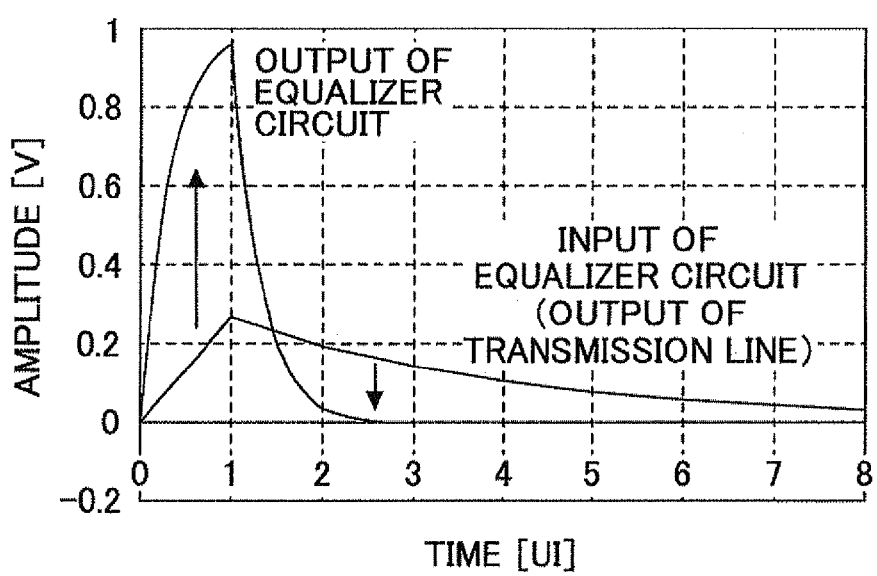
FIG. 2 is a drawing illustrating a unit pulse response of the equalizer circuit.
Figure 3:
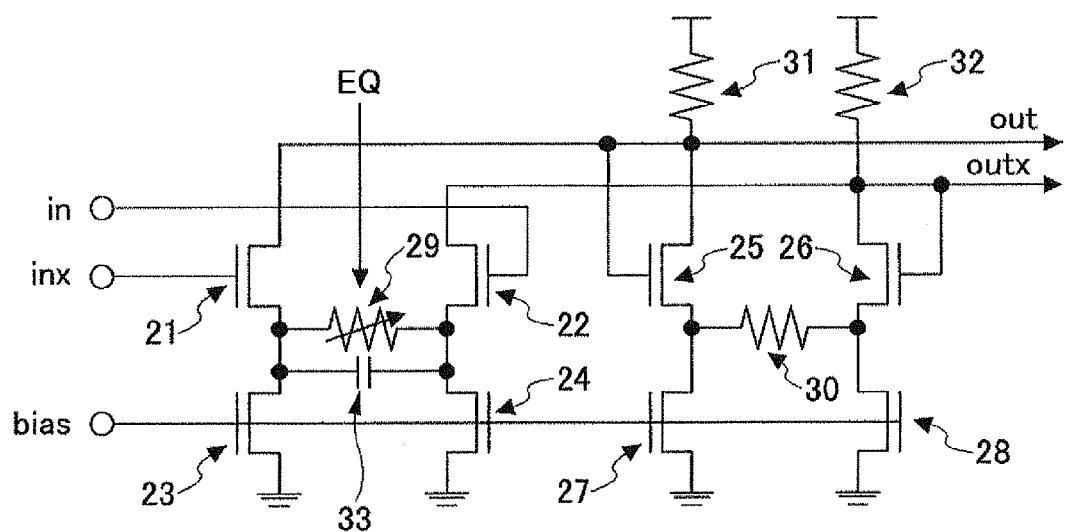
FIG. 3 is a drawing illustrating another example of the configuration of a related-art equalizer circuit.
Figure 4:
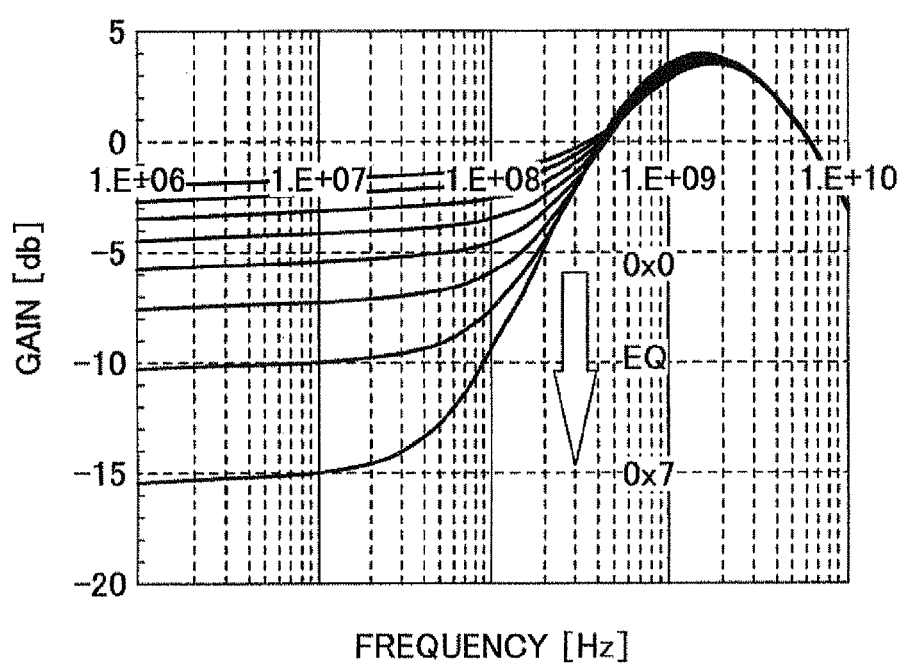
FIG. 4 is a drawing illustrating an example of the frequency characteristics of the equalizer circuit illustrated in FIG. 3.
Figure 5:
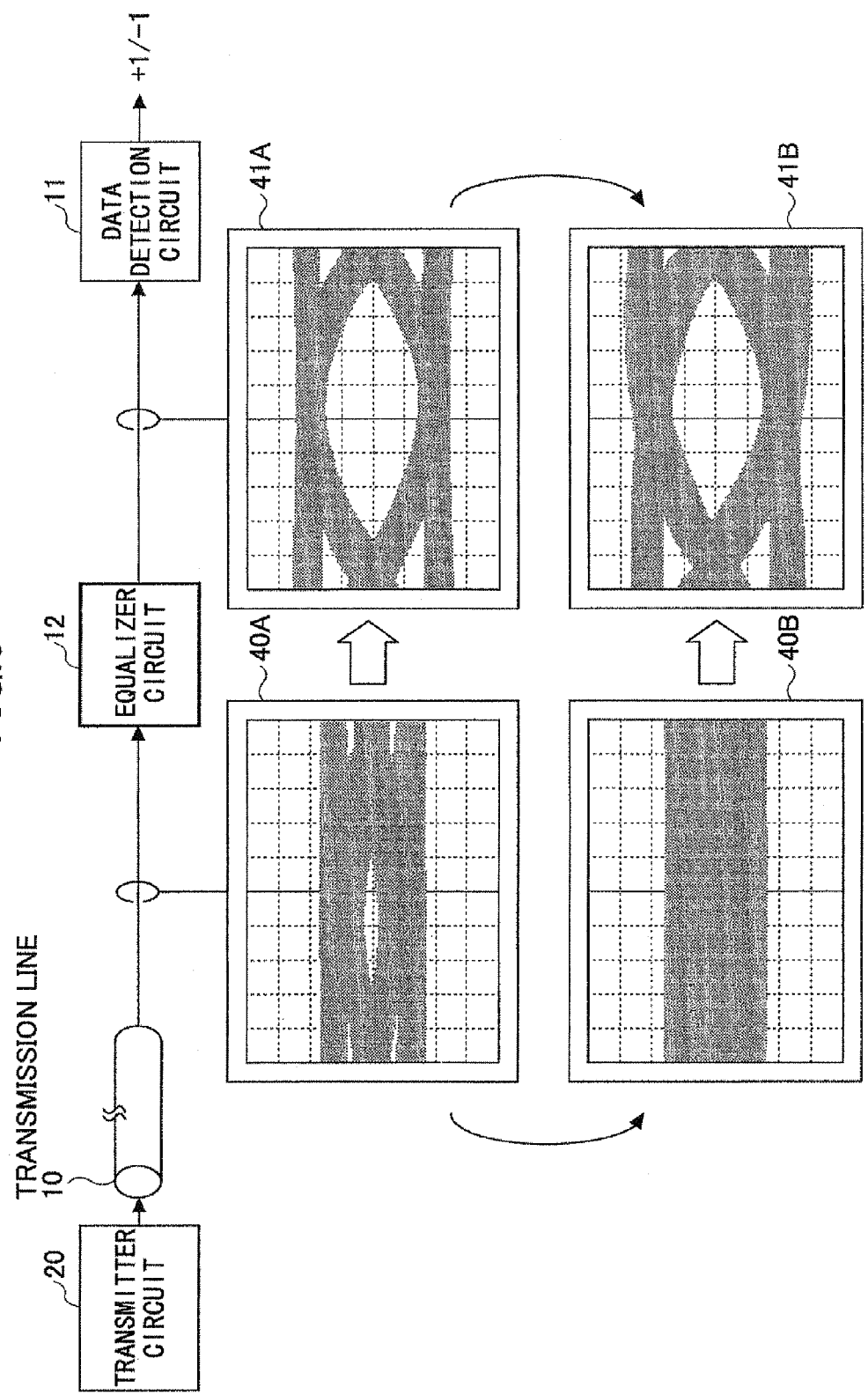
FIG. 5 is a drawing for explaining the concept of adaptive equalization.
Figure 6:
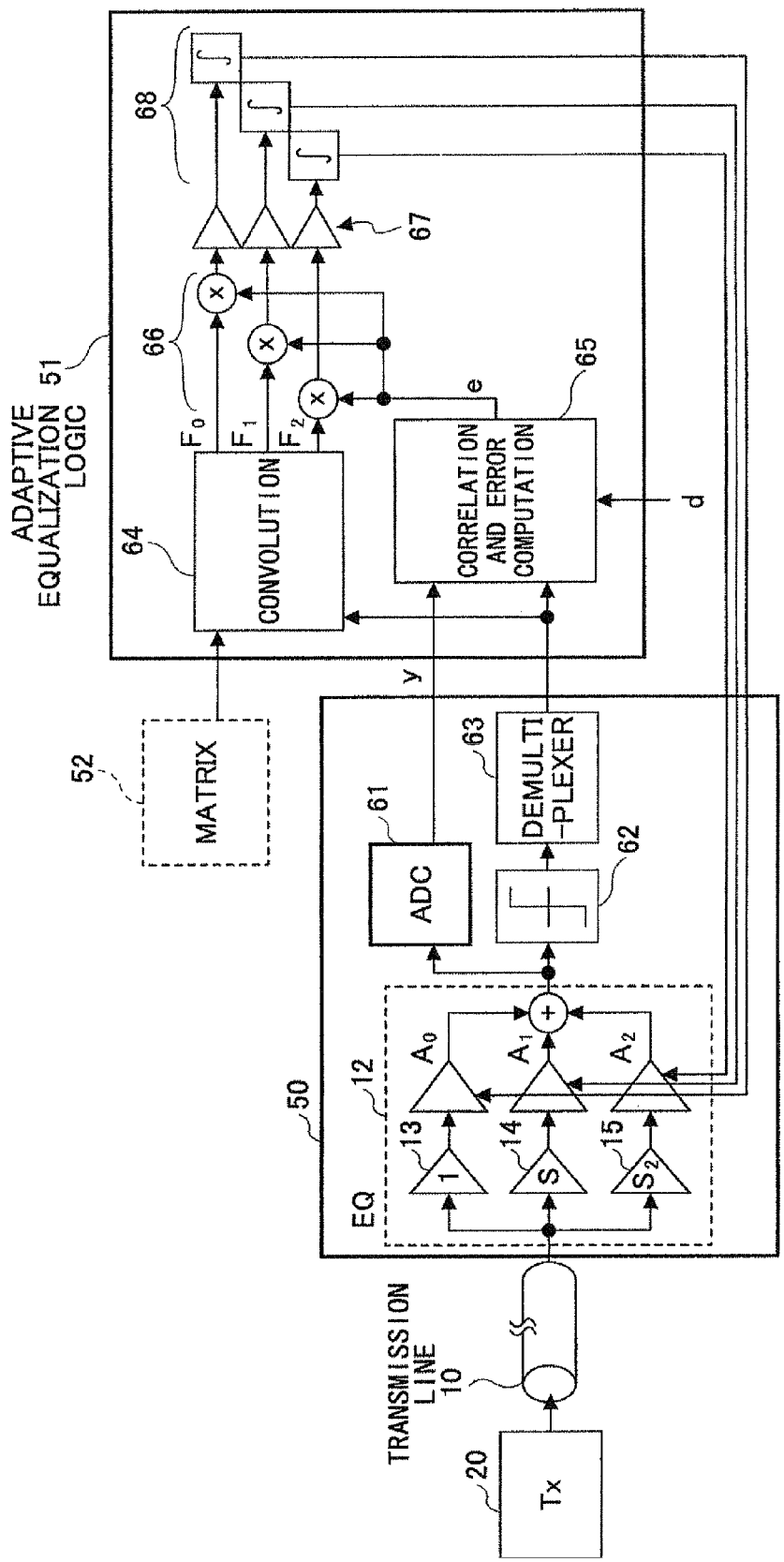
FIG. 6 is a drawing illustrating an example of the configuration of an adaptive equalizer circuit using the equalizer circuit of FIG. 1.
Figure 9A:
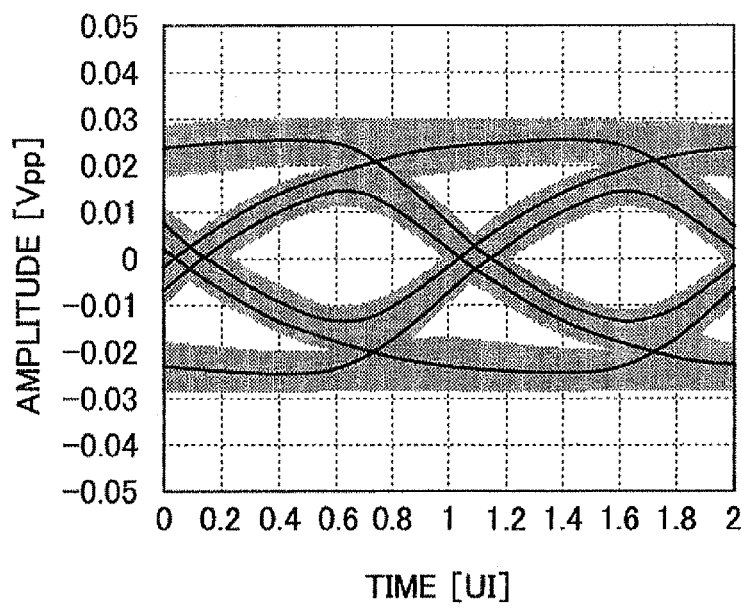
FIG. 9A is a drawing illustrating the simulation results of output eye patterns obtained for a system in which a transmission line model and the equalizer circuit model of FIG. 3 are serially cascaded.
Figure 9B:
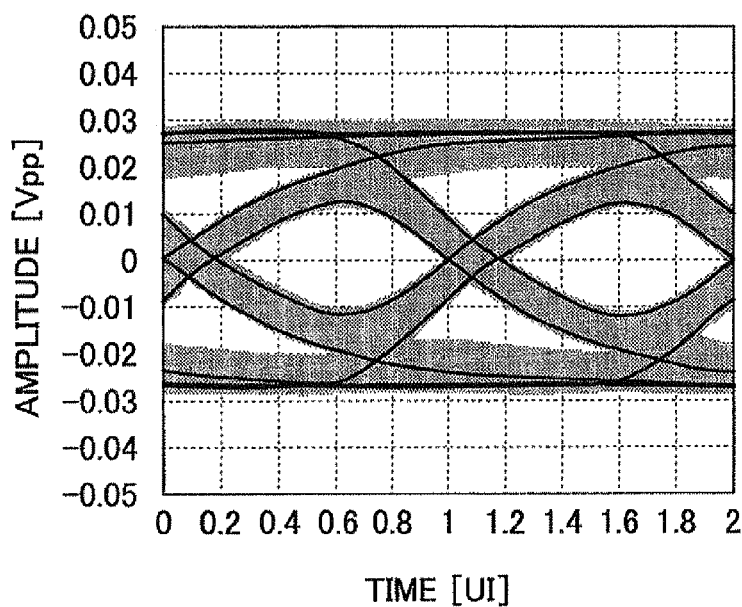
FIG. 9B is a drawing illustrating the simulation results of output eye patterns obtained for the system in which a transmission line model and the equalizer circuit model of FIG. 3 are serially cascaded.
Figure 9C:
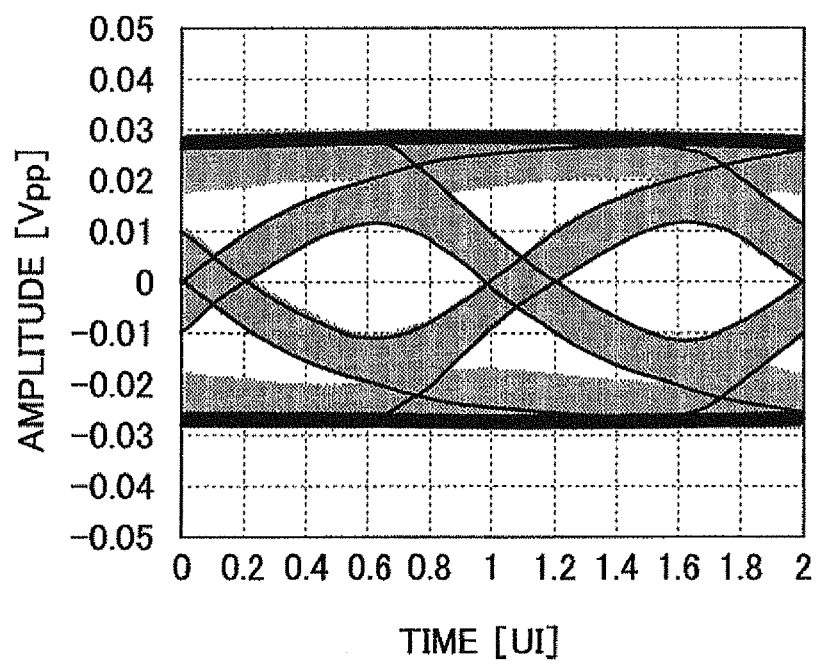
FIG. 9C is a drawing illustrating the simulation results of output eye patterns obtained for the system in which a transmission line model and the equalizer circuit model of FIG. 3 are serially cascaded.

FIGS. 9A through 9C are drawings illustrating the simulation results of output eye patterns obtained for a system in which a transmission line model and the equalizer circuit model of FIG. 3 are serially cascaded. In this example, PRBS23 patterns represented by a generator polynomial X23+X18+1 and various 0/1 run-length patterns are used as inputs. The horizontal axis represents time, and the vertical axis represents amplitude.

In FIG. 9A, eye patterns illustrated in solid lines are obtained when run-length-2 patterns ("001001 . . . " and "110110 . . . ") are inputs, and other eye patterns are obtained from PRBS23 pattern inputs. In FIG. 9B, eye patterns illustrated in solid lines are obtained when run-length-4 patterns ("0000100001 . . . " and "1111011110 . . . ") are inputs, and other eye patterns are obtained from PRBS23 pattern inputs. In FIG. 9C, eye patterns illustrated in solid lines are obtained when run-length-8 patterns ("000000001000000001 . . . " and "111111110111111110 . . . ") are inputs, and other eye patterns are obtained from PRBS23 pattern inputs.

As can be seen from FIGS. 9A through 9C, the longer the run length, the closer the corresponding eye patterns (i.e., the eye patterns illustrated in solid lines) to the edges of the distribution of eye patterns obtained from the PRBS23 pattern inputs. Namely, an output waveform obtained from an input pattern having a sufficiently long run length is the output waveform having the largest displacement in the distribution of data widths of all the output waveforms. In other words, an input pattern in which the same data value that is either 0 or 1 continues for a sufficiently long period followed by an inverted data value determines the data width of output waveforms in a time axis. The same applies in the case of data amplitude. Namely, an input pattern in which the same data value that is either 0 or 1 continues for a sufficiently long period followed by an inverted data value determines the data amplitude of output waveforms.

Utilizing the above-noted feature, the disclosed embodiment detects a pattern having a sufficiently long run-length, and adjusts an equalizing factor such that the data width corresponding to this detected pattern becomes equal to a desired data width. Namely, a pattern in which the same data value that is either 0 or 1 continues for a sufficiently long period followed by an inverted data value is detected, and the equalizing factor is adjusted such that the data width corresponding to this detected pattern becomes equal to the unit time length.

Figure 10:
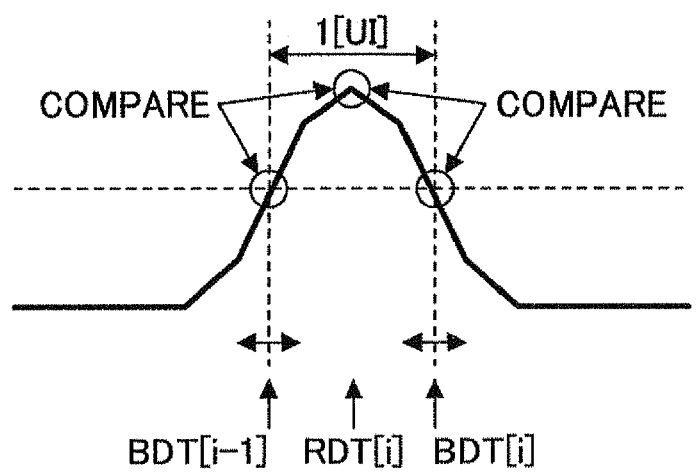
FIG. 10 is a drawing for explaining a method of evaluating data width.

FIG. 10 is a drawing for explaining a method of evaluating data width. In FIG. 10, the horizontal axis represents time, and the vertical axis represents signal amplitude. A waveform illustrated in FIG. 10 is an output data signal of the equalizer circuit 110 obtained when a pattern having consecutive data values "1" followed by an inverted data value "1" is input.

The data detecting circuit 111 (see FIG. 8) samples the output data signal at the center timing of a unit time (i.e., 1[UI]) to detect the sampled signal level, thereby producing the detection result RDT[i]. The boundary detecting circuit 112 (see FIG. 8) samples the output data signal at the position that is +½ unit time apart from the center timing and/or at the position that is −½ unit time apart from the center timing, thereby detecting the sampled signal level to produce the detection result BDT [i] and/or BDT[i−1]. The detection results RDT[i], BDT[i], and BDT[i−1] are +1 for the first logic value (e.g., HIGH) of the output data signal, and are −1 for the second logic value (e.g., LOW)

The control unit 115 (see FIG. 8) compares the detection result RDT[i] with the detection result BDT[i]. The control unit 115 produces a comparison result having a value of +1 if these two values are the same, for example, and produces a comparison result having a value of −1 (i.e., the value that cancels out +1) if these two values are different from each other. The control unit 115 accumulates such comparison results through successive addition for each occurrence of a predetermined pattern having a consecutive data series of the same data value that is either 0 or 1 followed by an inverted data value. If the data width of the output data signal is close to one unit time, the comparison result being +1 and the comparison result being −1 are supposed to exist with substantially equal probability. Namely, the closer the data width to one unit time, the smaller the absolute value of the accumulated sum. A similar assertion may be made with respect to the comparison results of the detection result RDT[i] and the detection result BDT[i−1].

Figure 11:
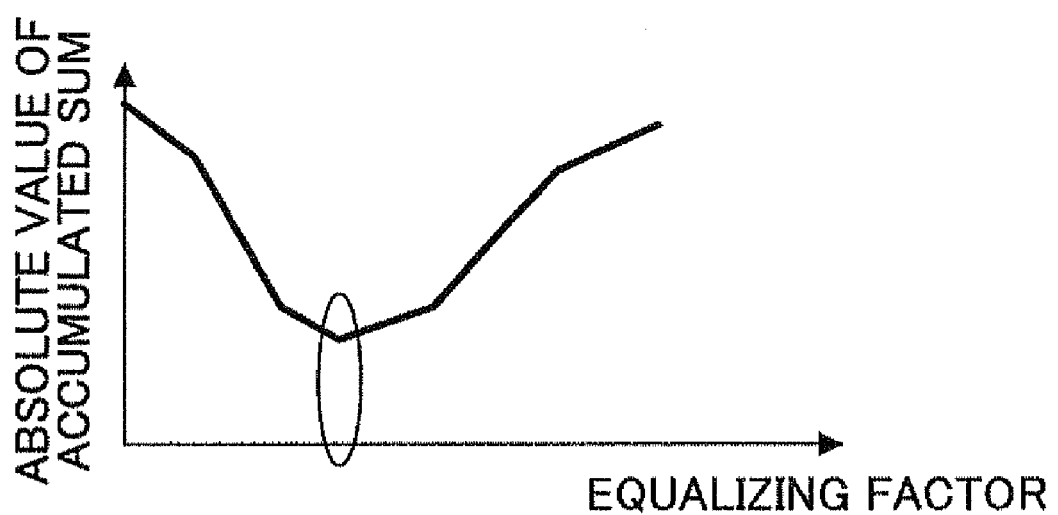
FIG. 11 is a drawing illustrating changes in the absolute value of accumulated sum when an equalizing factor is changed.

FIG. 11 is a drawing illustrating changes in the absolute value of accumulated sum when the equalizing factor is changed. The horizontal axis represents equalizing factor value, and the vertical axis represents the absolute value of accumulated sum.

As illustrated in FIG. 11, the absolute value of accumulated sum changes with the equalizing factor value. The absolute value of accumulated sum assumes its minimum value when the equalizing factor value assumes a certain value. The equalizing factor of the equalizer circuit 110 is set equal to such an equalizing factor value, thereby achieving a condition in which the data width of the output data signal of the equalizer circuit 110 is close to one unit time.

Figure 12:
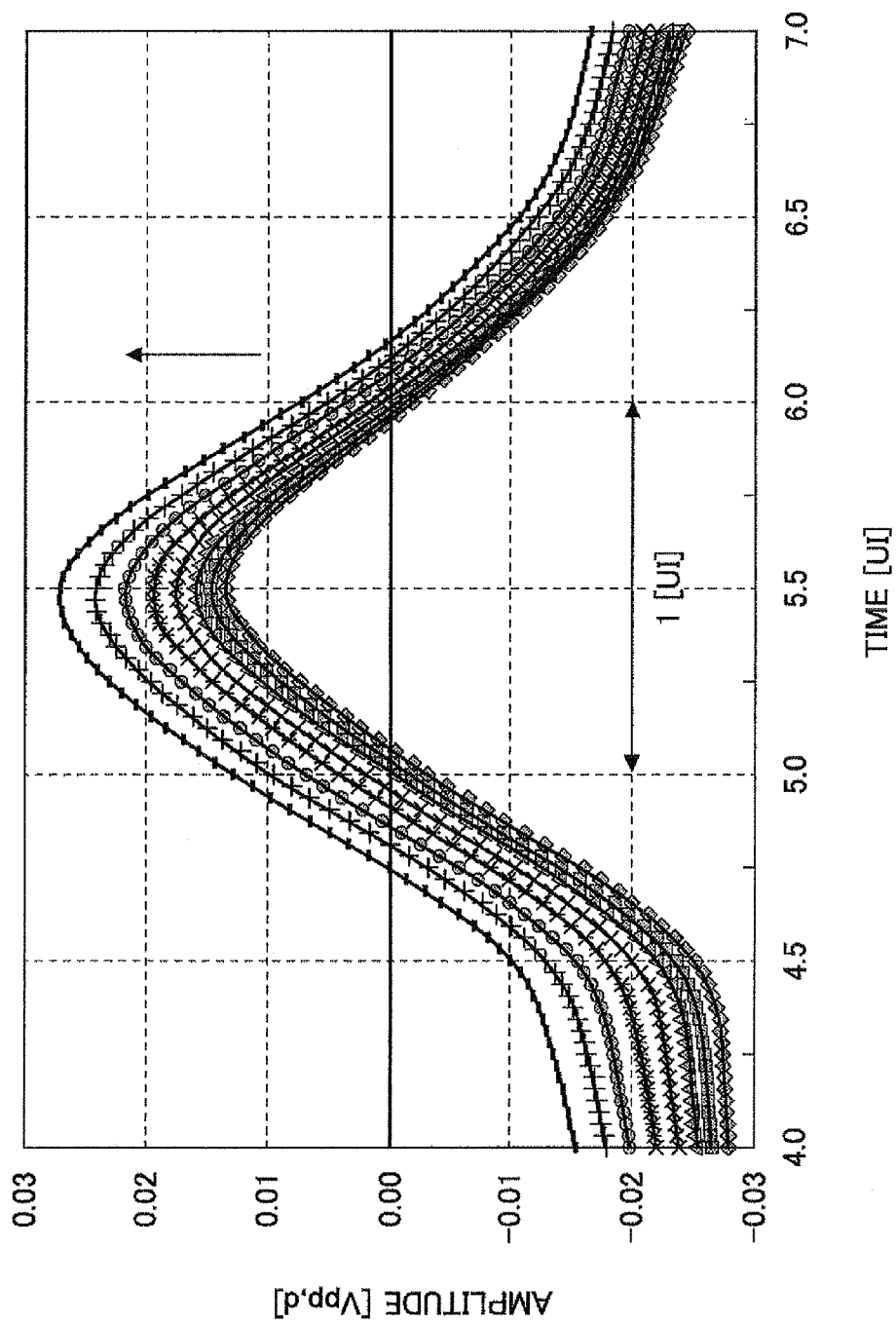
FIG. 12 is a drawing illustrating changes in the data width of an output data signal when the equalizing factor is changed.

FIG. 12 is a drawing illustrating changes in the data width of the output data signal when the equalizing factor is changed. The horizontal axis represents time, and the vertical axis represents amplitude. FIG. 12 is directed to data reception with respect to a 3.2-Gb/s pattern in which "0010" is repeated. The loss of the transmission line is approximately 21 [dB] at the Nyquist frequency (=1.6 [GHz]). As the equalizing factor increases, the waveform of the output data signal further moves upward as indicated by an arrow.

As can be seen from FIG. 12, the data width changes with the equalizing factor. The data width becomes the closest to one unit time (i.e., 1 [UI]) when the equalizing factor value assumes a certain value. The equalizing factor of the equalizer circuit 110 is set equal to such an equalizing factor value, thereby achieving a condition in which the data width of the output data signal of the equalizer circuit 110 is close to one unit time.

Figure 13:
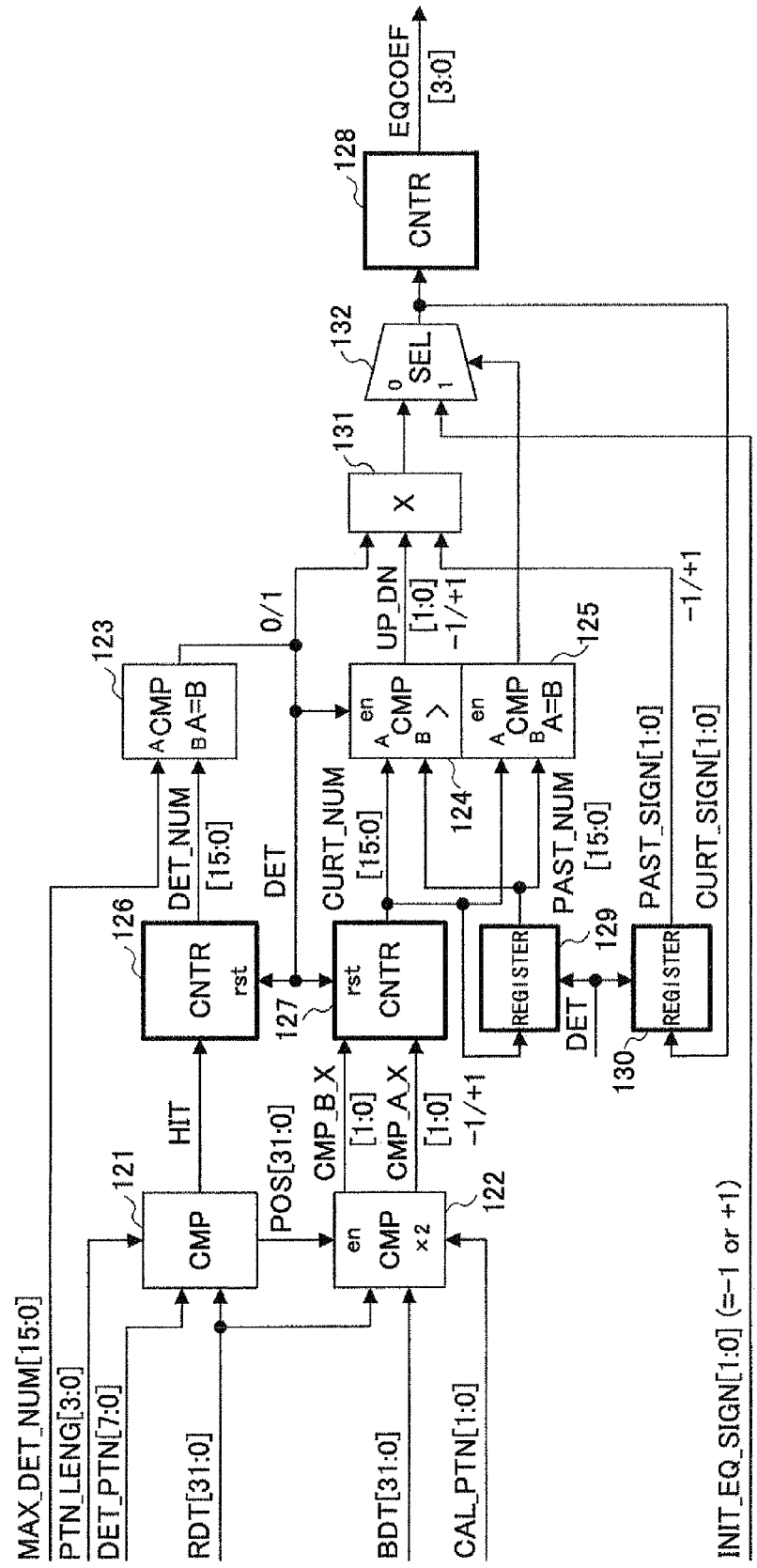
FIG. 13 is a drawing illustrating an example of the configuration of a control unit.

FIG. 13 is a drawing illustrating an example of the configuration of the control unit 115. The control unit 115 illustrated in FIG. 13 includes comparators (CMP) 121 through 125, counters (CNTR) 126 through 128, registers 129 and 130, a multiplier 131, and a selector (SEL) 132. The control unit 115 of FIG. 13 is directed to a case in which the detection result RDT of the data detecting circuit 111 and the detection result BDT of the boundary detecting circuit 112 are 32-bit parallel data RDT[31:0] and BDT[31:0], respectively.

The data pattern to be detected by the control unit 115 is defined by a detection data pattern DET_PTN[7:0]. Further, an effective pattern length PTN_LENG[3:0] defines how many bits of the detection data pattern are to be actually used as a data pattern to be detected. Further, a maximum detection number value MAX_DET_NUM[15:0] and an initial equalizing factor displacement sign INIT_EQ_SIGN[1:0] are set.

Figure 14:
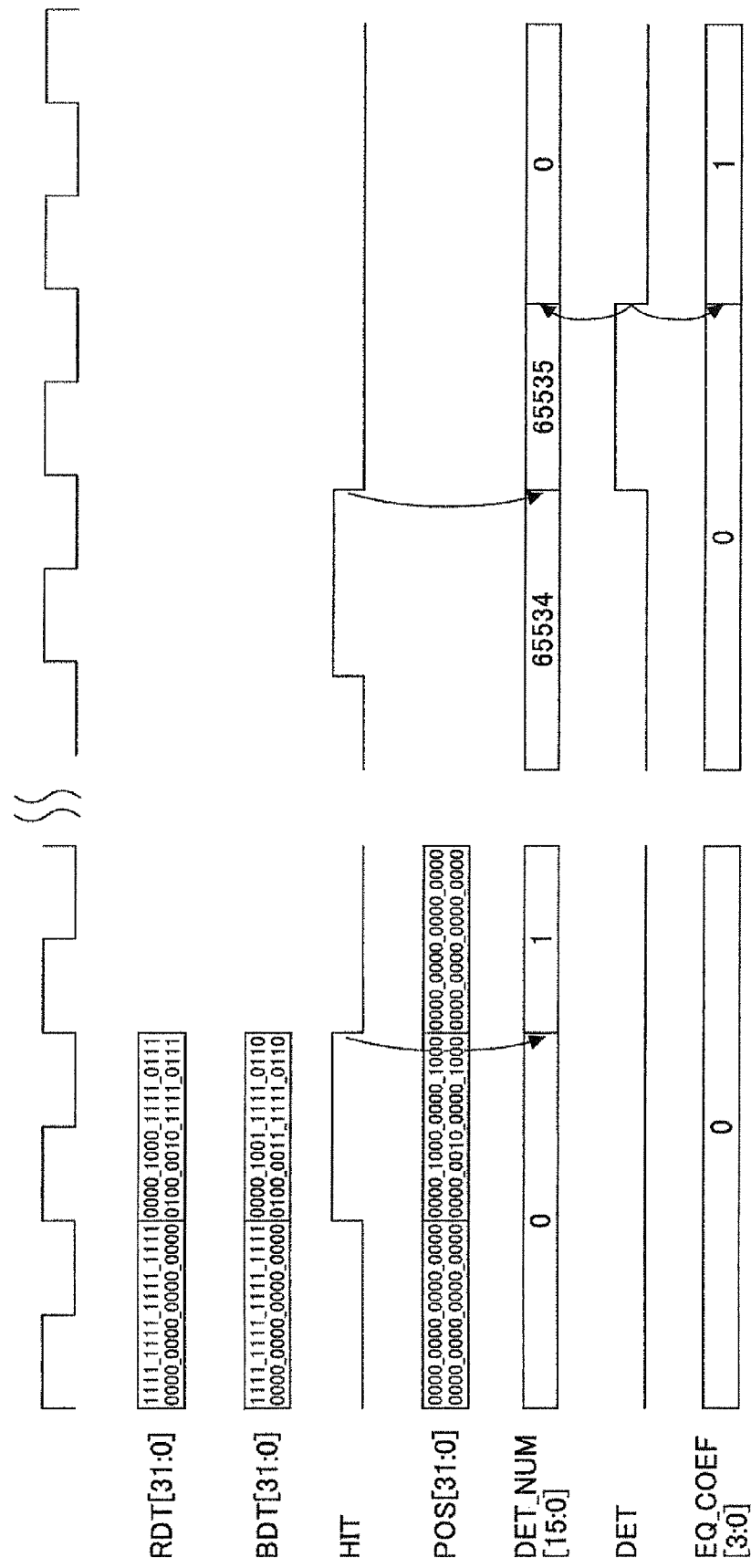
FIG. 14 is a drawing illustrating an example of the operation of the control unit illustrated in FIG. 13.

FIG. 14 is a drawing illustrating an example of the operation of the control unit 115 illustrated in FIG. 13. In the operation example illustrated in FIG. 14, the detection data pattern DET_PTN[7:0] is "00000010", and the effective pattern length PTN_LENG[3:0] is "110", with MAX_DET_NUM[15:0] being 65535 in decimal representation. In this case, since the effective pattern length PTN_LENG[3:0] is 6 in decimal representation, the 6 lower-order bits of the detection data pattern DET_PTN[7:0], i.e., "000010", is used as a data pattern to be detected. Further, inverted data "111101" is also used as a data pattern to be detected.

In the following, a description will be given of the operation of the control unit 115 by referring to FIG. 13 and FIG. 14.

The comparator 121 sets a detection signal HIT to HIGH ("1") when a data pattern corresponding to a partial bit pattern of the DET_PTN[7:0] comprised of the number of bits specified by the effective pattern length PTN_LENG[3:0] is detected in the 32-bit parallel received data RDT[31:0]. At the same time, the comparator 121 generates a signal POS[31:0] indicative of the position of the detection. In an example illustrated in FIG. 14, "0000101" or "111101" is detected in RDT[31:0] thereby to set the signal HIT equal to HIGH. Further, POS[31:0] becomes "1" at the bit position corresponding to the bit position of "1" appearing in "000010" that is detected in RDT[31:0] and also at the bit position corresponding to the bit position of "0" appearing in "111101" that is detected in RDT[31:0]. POS[31:0] is "0" at the remaining bit positions.

The comparator 122 compares the value of RDT[31:0] at the position corresponding to "1" appearing in POS[31:0] with the values of BDT[31:0] corresponding to its immediately preceding and following positions (i.e., timings that are at ±0.5 unit time). The comparator 122 includes two comparators. The first comparator compares the RDT value with the BDT value observed at the timing displaced by −0.5 unit time, and the second comparator compares the RDT value with the BDT value observed at the timing displaced by +0.5 unit time. A result of comparison CMP_B_X[1:0] (X=0-31) obtained by the first comparator may assume +1 in the case of a match, and may assume −1 in the case of a mismatch. A result of comparison CMP_A_X[1:0] (X=0-31) obtained by the second comparator may assume +1 in the case of a match, and may assume −1 in the case of a mismatch. If POS[31:0] are all "0", the results of comparison are all zero.

CAL_PTN[1:0] supplied to the comparator 122 controls which one of the first comparator and the second comparator is enabled and which one is disabled. If CAL_PTN[1:0] is "00", for example, both comparators are enabled, thereby performing both comparison operations. If CAL_PTN[1:0] is "10", for example, only the first comparator is enabled, thereby performing only the one corresponding comparison operation. If CAL_PTN[1:0] is "10", for example, only the second comparator is enabled, thereby performing only the one corresponding comparison operation. The disabled comparator has the output thereof always set to zero.

When HIT changes to HIGH and then returns to LOW, the counter 126 increments its count by one in response to this falling edge. The comparator 123 compares the count value DET_NUM[15:0] of the counter 126 with the maximum detected number value MAX_DET_NUM[15:0] to set a signal DET equal to "1" in response to a match. In the example illustrated in FIG. 14, the signal DET is set equal to "1" when the count value DET_NUM[15:0] becomes 65535 equal to MAX_DET_NUM[15:0].

In conjunction with the count-up operation of the counter 126, the counter 127 accumulates CMP_B_X and CMP_A_X separately from each other through successive additions. An output CURT_NUM[15:0] of the counter 127 is the absolute value of accumulated sum of CMP_B_X plus the absolute value of accumulated sum of CMP_A_X.

In response to DET becoming "1", the comparator 124 compares CURT_NUM[15:0] currently output from the counter 127 with PAST_NUM[15:0] stored in the register 129. PAST_NUM[15:0] is equal to CURT_NUM[15:0] that is observed when DET became "1" on the preceding occasion.

The comparator 124 outputs −1 as its output UP_DN[1:0] when the result of comparison indicates that CURT_NUM [15:0] is larger than PAST_NUM[15:0]. The fact that CURT_NUM[15:0] is larger than PAST_NUM[15:0] indicates that a difference between the data width and one unit time length has increased from the preceding occasion, which means that the direction in which the equalizing factor was changed on the preceding occasion was wrong. Accordingly, the "−1" output of the comparator 124 serves to reverse the direction of change of the equalizing factor from the previous direction.

The comparator 124 outputs +1 as its output UP_DN[1:0] when the result of comparison indicates that CURT_NUM [15:0] is smaller than PAST_NUM[15:0]. The fact that CURT_NUM[15:0] is smaller than PAST_NUM[15:0] indicates that a difference between the data width and one unit time length has decreased from the preceding occasion, which means that the direction in which the equalizing factor was changed on the preceding occasion was correct. Accordingly, the "+1" output of the comparator 124 serves to maintain the direction of change of the equalizing factor to be the same as the previous direction.

The multiplier 131 multiplies the output UP_DN[1:0] of the comparator 124, PAST_SIGN[1:0] stored in the register 130, and DET, thereby obtaining a direction of change for this occasion. PAST_SIGN[1:0] is data assuming a value of −1 or +1 indicative of a direction of change on the preceding occasion. If the output UP_DN[1:0] of the comparator 124 is −1, the sign of PAST_SIGN[1:0] indicative of the direction of change is reversed. If the output UP_DN[1:0] of the comparator 124 is +1, the sign of PAST_SIGN[1:0] indicative of the direction of change is maintained as it is.

There is a case in which CURT_NUM[15:0] becomes equal to PAST_NUM[15:0]. In such a case, decision may not be made as to the direction of change. If the comparator 125 detects CURT_NUM[15:0]=PAST_NUM[15:0], thus, the selector 132 selects INIT_EQ_SIGN[1:0] as the data indicative of the direction of change. In other cases, the selector 132 selects the result of computation by the multiplier 131. The value selected by the selector 132 is used as final data CURT_SIGN[1:0] that indicates the direction of change on the present occasion.

As a general principle, INIT_EQ_SIGN[1:0] is set equal to "11" (=−1) if the initial value of the equalizing factor is set equal to its maximum value. On the other hand, INIT_EQ_SIGN[1:0] is set equal to "01" (=+1) if the initial value of the equalizing factor is set equal to its minimum value. The CURT_NUM=PAST_NUM condition is more likely to occur when the equalizing factor is deviated significantly from a proper value.

In response to DET becoming "1", the counters 126 and 127 are reset, so that DET_NUM[15:0] and CURT_NUM [15:0] are initialized to zero. Further, the count value of the counter 128 is incremented or decremented by one depending on the data CURT_SIGN[1:0] that is output from the selector 132 indicating the direction of change on the present occasion. The output of the counter 128 is supplied to the equalizer circuit 110 as the equalizing factor.

Figure 15A:
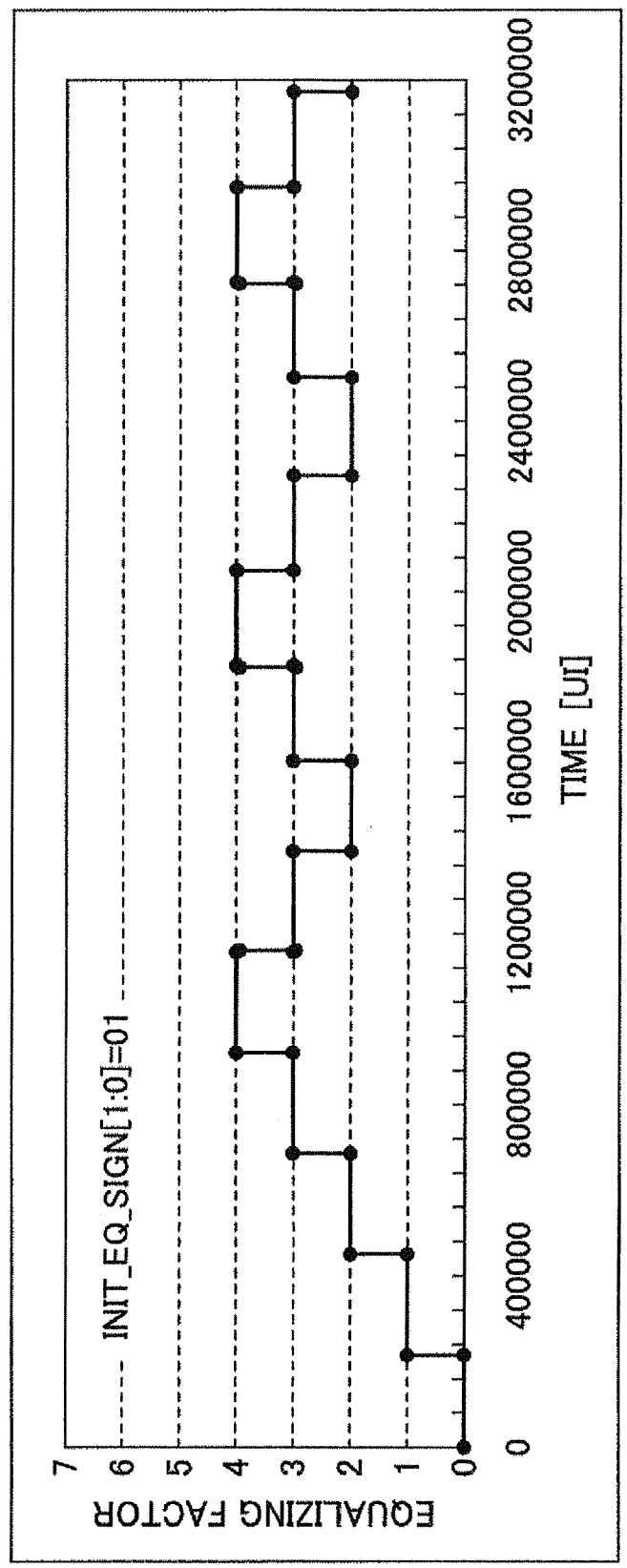
FIG. 15A is a drawing illustrating the simulation results of adaptive equalization obtained by using the control unit 115 of FIG. 13.
Figure 15B:
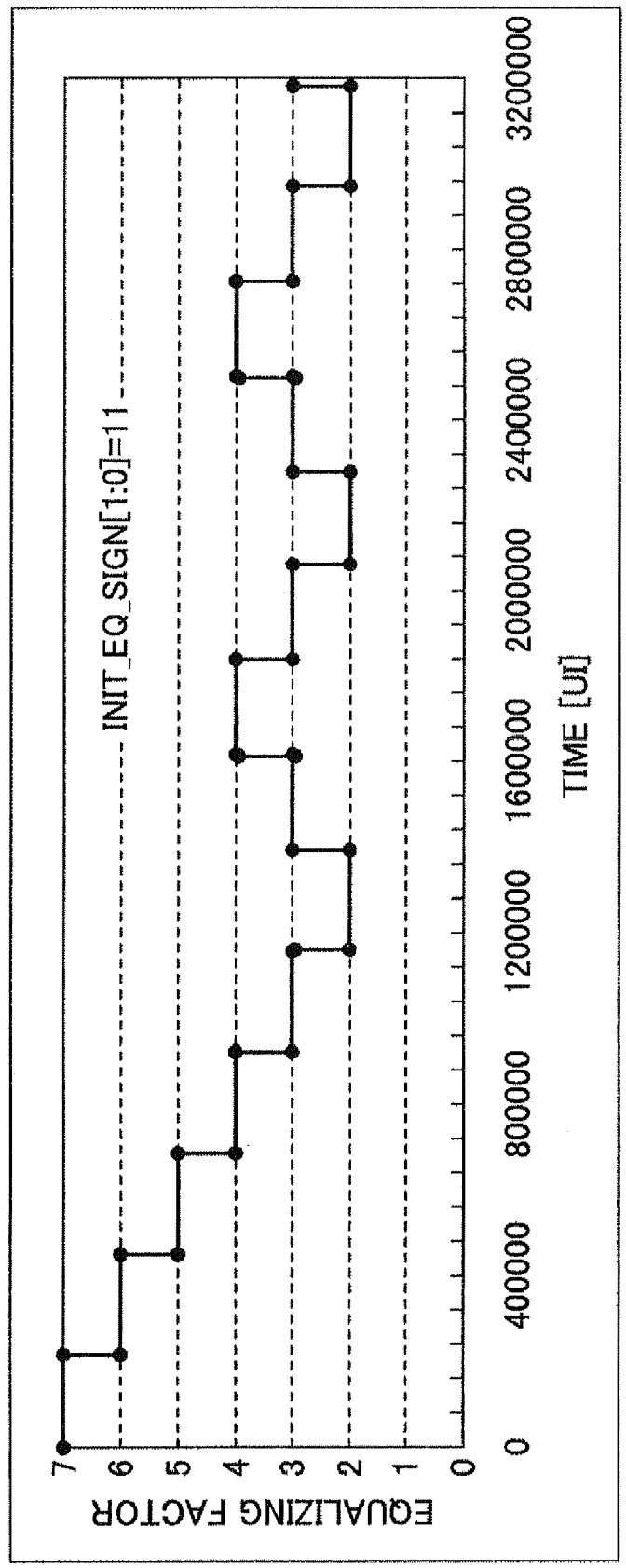
FIG. 15B is a drawing illustrating the simulation results of adaptive equalization obtained by using the control unit 115 of FIG. 13.
Figure 16A:
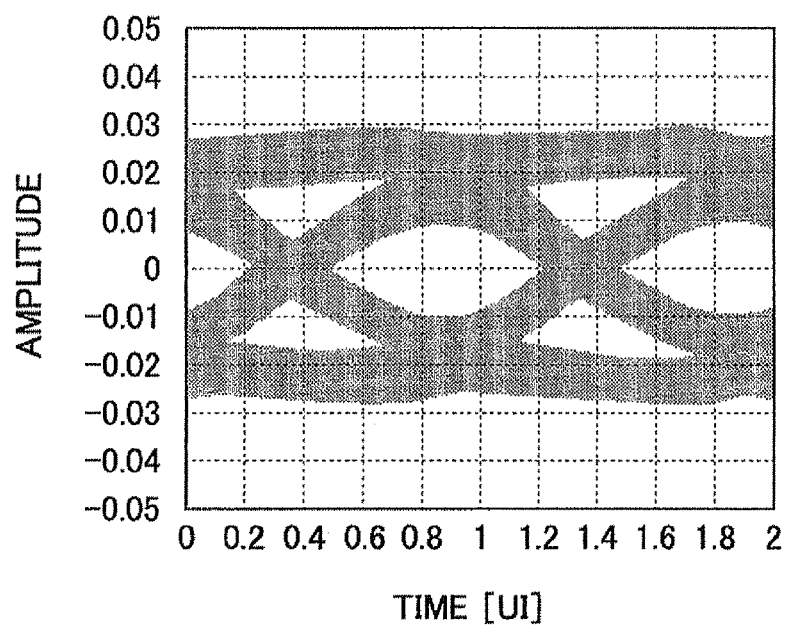
FIG. 16A is a drawing illustrating the simulation result of an eye pattern obtained for a corresponding equalizing factor value.
Figure 16B:
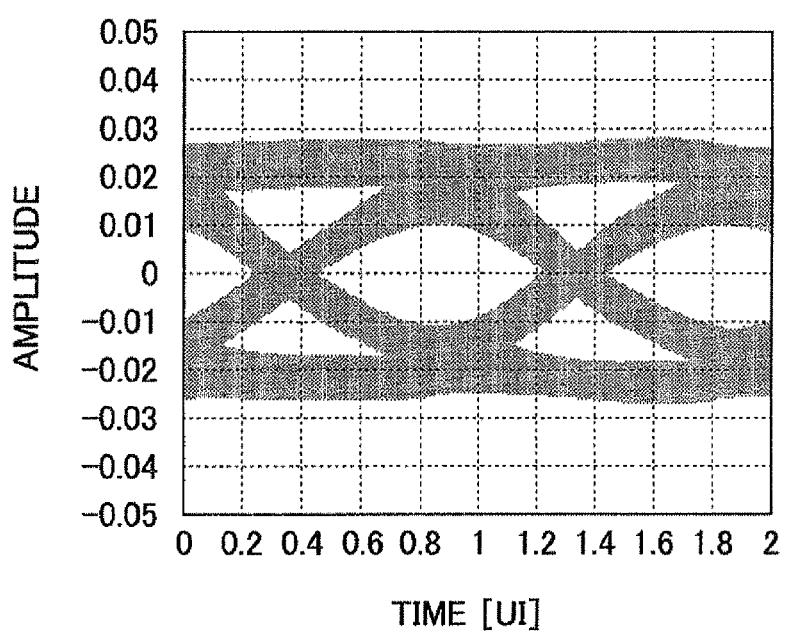
FIG. 16B is a drawing illustrating the simulation result of an eye pattern obtained for a corresponding equalizing factor value.
Figure 16C:
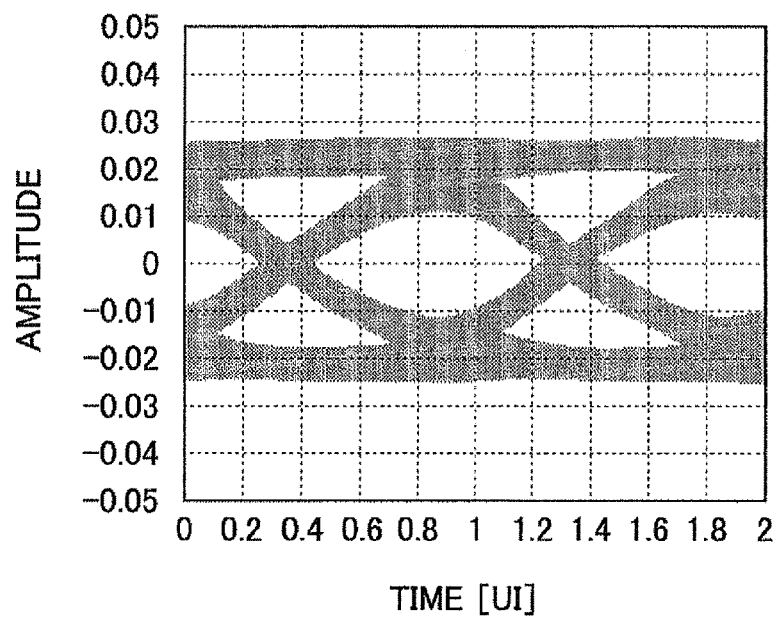
FIG. 16C is a drawing illustrating the simulation result of an eye pattern obtained for a corresponding equalizing factor value.
Figure 16D:
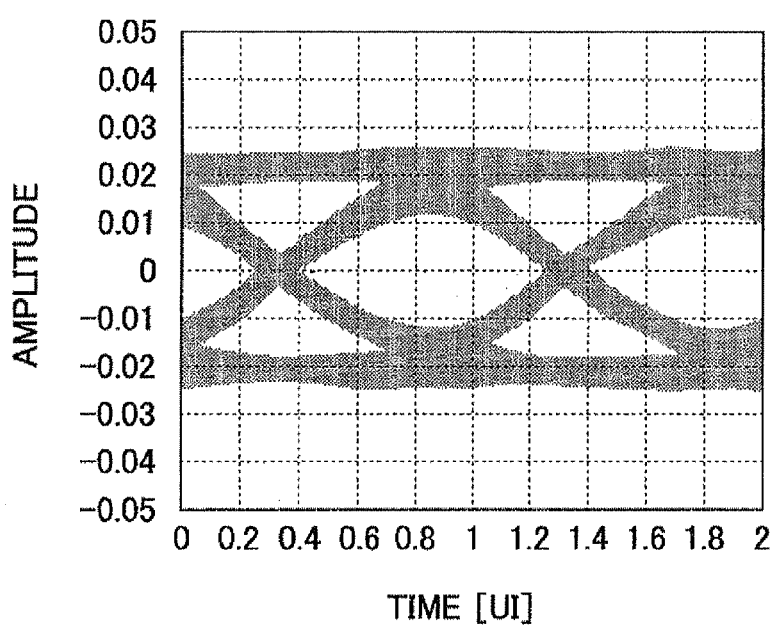
FIG. 16D is a drawing illustrating the simulation result of an eye pattern obtained for a corresponding equalizing factor value.
Figure 16E:
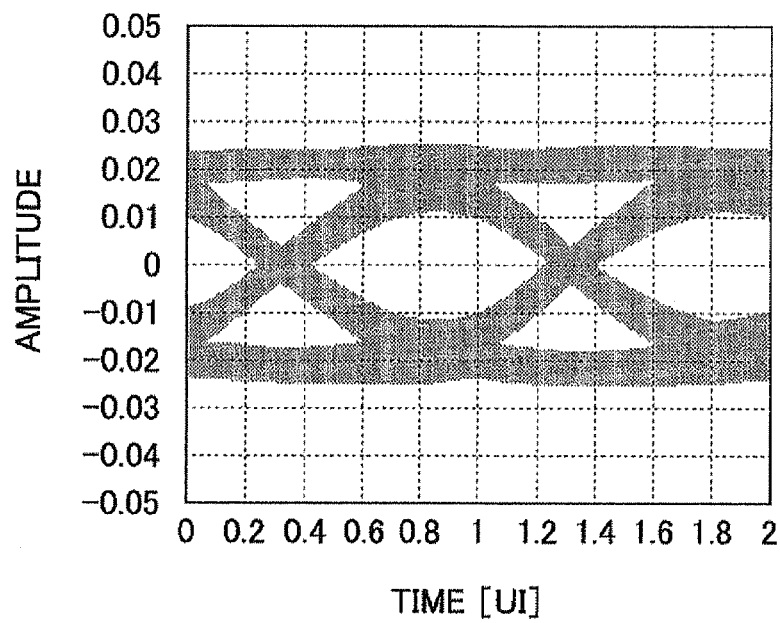
FIG. 16E is a drawing illustrating the simulation result of an eye pattern obtained for a corresponding equalizing factor value.
Figure 16F:
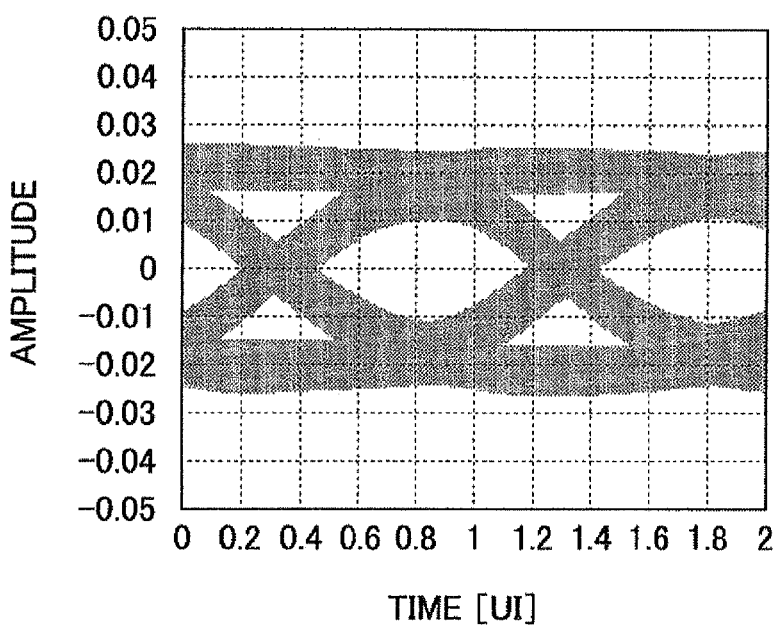
FIG. 16F is a drawing illustrating the simulation result of an eye pattern obtained for a corresponding equalizing factor value.
Figure 16G:
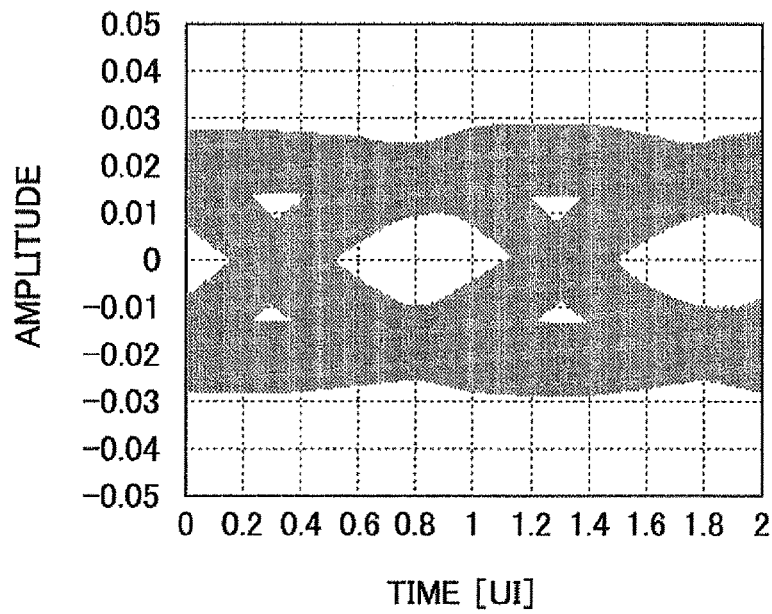
FIG. 16G is a drawing illustrating the simulation result of an eye pattern obtained for a corresponding equalizing factor value.
Figure 16H:
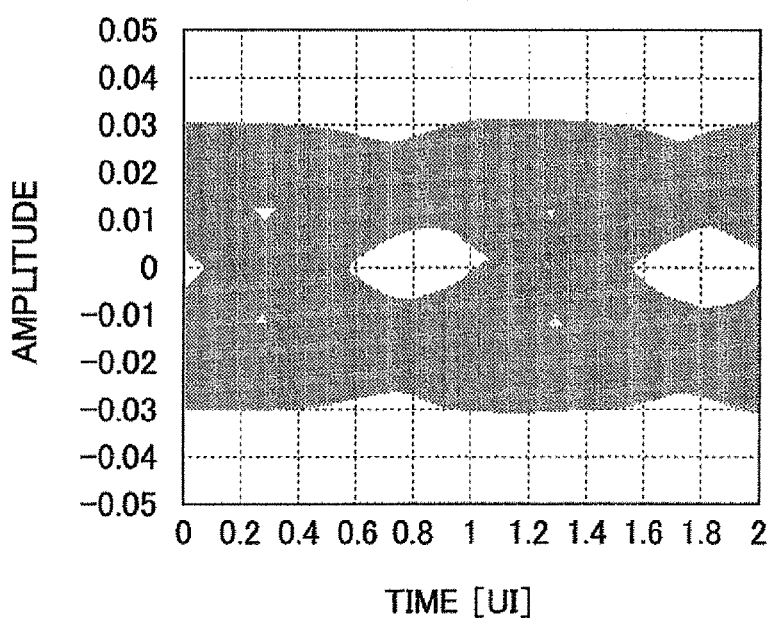
FIG. 16H is a drawing illustrating the simulation result of an eye pattern obtained for a corresponding equalizing factor value.

FIGS. 15A and 15B are drawings illustrating the simulation results of adaptive equalization obtained by using the control unit 115 of FIG. 13. FIGS. 16A through 16H are drawings illustrating the simulation results of eye patterns obtained for respective equalizing factor values.

In this example, data reception at 3.2 [Gb/s] is assumed. The loss of the transmission line model is approximately 21 [dB] at the Nyquist frequency (=1.6 [GHz]). Input data patterns are obtained by applying 8B10B coding to PRBS23 patterns. The longest 0/1 run-length contained in the input data patterns is 5. Since the frequency of occurrence of the patterns having a run-length of 5 is extremely low, DET_PTN [7:0]="00000010" and PTN_LENG[3:0]="0110" are used in this simulation to detect the patterns having a 0/1 run-length of 4.

As illustrated in FIGS. 15A and 15B, the equalizing factor starts from an initial value that is equal to either 0 or 7, and thereafter changes with time. After the passage of a sufficient time, the equalizing factor converges on 3 regardless of the initial value of the equalizing factor.

The eye patterns of FIGS. 16A through 16H correspond to the equalizing factors 0 through 7, respectively. As can be seen from FIGS. 16A through 16H, the data width is the closest to one unit time length when the equalizing factor is equal to 3. In that state, jitters of waveforms are also the smallest. In this manner, the equalizing factor can be adjusted to minimize the width of phase variation in the output data signal of the equalizer circuit 110.

According to at least one embodiment, attention is focused on the fact that a data pattern in which the same data value that is either 0 or 1 continues for a sufficiently long period followed by an inverted data value determines the temporal data width and data amplitude of output data signal waveforms. A predetermined data pattern having consecutive data items of a first logic value followed by a data item of a second logic values is detected multiple times, and the equalizing factor is adjusted such that a percentage of times that the data detection result and the boundary detection result assume values equal to each other is substantially equal to a percentage of times that these detection results assume values different from each other. Accordingly, an adaptive equalizer circuit may be provided that adjusts an equalizing factor by use of a relatively simple circuit configuration comprised of comparators, counters, and the like while ensuring relatively small circuit scale and power consumption, compared with the configuration that employs a correlation and error computing circuit. The embodiment may be applied to a receiver circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An adaptive equalizer circuit, comprising:
an equalizer circuit configured to produce an output data signal by correcting an input data signal waveform for each unit time in response to an equalizing factor;
a data detecting circuit configured to detect a signal level of the output data signal in a given unit time at a predetermined timing indicated by a clock signal synchronized with the output data signal;
a boundary detecting circuit configured to detect a signal level of the output data signal at a timing that is ½ unit time away from the predetermined timing indicated by the clock signal; and
a control circuit configured to detect, multiple times, a predetermined data pattern having consecutive data items of a first logic value followed by a data item of a second logic value and further followed by a data item of the first logic value, and to adjust the equalizing factor such that a value of a detection result obtained by the data detecting circuit and a value of a detection result obtained by the boundary detecting circuit for the data item of the second logic value are equal to each other a certain percentage of times, and are different from each other substantially the same percentage of times, the equalizing factor being adjusted such that a data width of the predetermined data pattern becomes equal to one unit time.

2. The adaptive equalizer circuit as claimed in claim 1, wherein the control circuit includes a detection circuit configured to detect the predetermined data pattern by detecting a match with a pattern defining a detection target, and a number of consecutive data items of the first logic value is variable in the pattern defining the detection target.

3. The adaptive equalizer circuit as claimed in claim 1, wherein the control circuit is configured to assign a first value to a case of the values of the detection results being equal to each other, to assign a second value responsive to the first value to a case of the values of the detection results being different from each other, to obtain an accumulated sum of the first value and the second value for the multiple-time detections, and to adjust the equalizing factor in response to the accumulated sum.

4. The adaptive equalizer circuit as claimed in claim 1, wherein the control circuit is configured to adjust the equalizing factor each time the predetermined data pattern is detected a predetermined number of times, and to allow the predetermined number to be variably set.

5. The adaptive equalizer circuit as claimed in claim 1, further comprising a clock recovery circuit configured to generate the clock signal in response to a detection result obtained by the data detecting circuit and a detection result obtained by the boundary detecting circuit.

6. The adaptive equalizer circuit as claimed in claim 1, wherein the boundary detecting circuit is configured to generate a first detection result by detecting a signal level of the output data signal at a timing that is +½ unit time away from the predetermined timing indicated by the clock signal, to generate a second detection result by detecting a signal level of the output data signal at a timing that is −½ unit time away from the predetermined timing indicated by the clock signal, and to supply the first detection result and the second detection result to the control circuit as detection results.

7. The adaptive equalizer circuit as claimed in claim 6, wherein the control circuit is configured to adjust the equalizing factor such that a value of a detection result obtained by the data detecting circuit and a value of the first detection result obtained by the boundary detecting circuit for the data item of the second logic value are equal to each other a certain percentage of times, and are different from each other substantially the same percentage of times, and such that the value of the detection result obtained by the data detecting circuit and a value of the second detection result obtained by the boundary detecting circuit for the data item of the second logic value are equal to each other a certain percentage of times, and are different from each other substantially the same percentage of times.

8. The adaptive equalizer circuit as claimed in claim 6, wherein the control circuit is configured to allow either one of the first detection result and the second detection result to be selected for use in the adjustment of the equalizing factor.

9. The adaptive equalizer circuit as claimed in claim 1, wherein the equalizing factor is a coefficient configured to control a gain of the equalizer circuit.

10. An adaptive equalizer circuit, comprising:
an equalizer circuit configured to produce an output data signal by correcting an input data signal waveform for each unit time in response to an equalizing factor;
a data detecting circuit configured to detect a signal level of the output data signal in a given unit time at a predetermined timing indicated by a clock signal synchronized with the output data signal;
a boundary detecting circuit configured to detect a signal level of the output data signal at a timing that is ½ unit time away from the predetermined tinning indicated by the clock signal; and
a control circuit configured to detect, multiple times, a predetermined data pattern having consecutive data items of a first logic value followed by a data item of a second logic value, and to adjust the equalizing factor such that a value of a detection result obtained by the data detecting circuit and a value of a detection result obtained by the boundary detecting circuit for the data item of the second logic value are equal to each other a certain percentage of times, and are different from each other substantially the same percentage of times,
wherein the control circuit is configured to assign a first value to a case of the values of the detection results being equal to each other, to assign a second value responsive to the first value to a case of the values of the detection results being different from each other, to obtain an accumulated sum of the first value and the second value for the multiple-time detections, and to adjust the equalizing factor in response to the accumulated sum,
and wherein the control circuit is configured to repeatedly obtain the accumulated sum, to repeatedly adjust the equalizing factor in response to an absolute value of the accumulated sum, and to allow a direction of change of the equalizing factor to be set when the absolute value consecutively assumes a same value.

* * * * *